United States Patent
Rivoir (10) Patent No.: US 11,036,623 B2
(45) Date of Patent: Jun. 15, 2021

(54) TEST APPARATUS AND METHOD FOR CHARACTERIZING A DEVICE UNDER TEST

(71) Applicant: Advantest Corporation, Tokyo (JP)

(72) Inventor: Jochen Rivoir, Magstadt (DE)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 16/543,443

(22) Filed: Aug. 16, 2019

(65) Prior Publication Data
US 2019/0370158 A1  Dec. 5, 2019

Related U.S. Application Data

(63) Continuation of application No. PCT/EP2017/055370, filed on Mar. 7, 2017.

(51) Int. Cl.
| | |
|---|---|
| *G06F 9/44* | (2018.01) |
| *G06F 9/445* | (2018.01) |
| *G06F 11/36* | (2006.01) |
| *G06F 11/263* | (2006.01) |

(52) U.S. Cl.
CPC ........ *G06F 11/3684* (2013.01); *G06F 11/263* (2013.01); *G06F 11/3688* (2013.01); *G06F 11/3692* (2013.01)

(58) Field of Classification Search
CPC ............... G06F 11/3684; G06F 11/263; G06F 11/3688; G06F 11/3692
See application file for complete search history.

(56) References Cited

U.S. PATENT DOCUMENTS

| | | |
|---|---|---|
| 5,615,380 A | 3/1997 | Hyatt |
| 6,885,700 B1 | 4/2005 | Kim et al. |
| 8,706,062 B1 | 4/2014 | Yu et al. |
| 9,330,227 B1 * | 5/2016 | Han ............... G01R 31/318314 |
| 2003/0058148 A1 | 3/2003 | Sheen |
| 2005/0048925 A1 | 3/2005 | Rands |
| 2005/0104597 A1 | 5/2005 | Klijn et al. |
| 2005/0172181 A1 | 8/2005 | Huliehel |

(Continued)

FOREIGN PATENT DOCUMENTS

CN  102521376 A  *  6/2012

OTHER PUBLICATIONS

Armin Beer, Efficient Test Data Generation for Variables with Complex Dependencies, 2008, pp. 3-11. https://ieeexplore.ieee.org/stamp/stamp.jsp?tp=&arnumber=4539527&isnumber=4539517 (Year: 2008).*

*Primary Examiner* — Mongbao Nguyen (57) ABSTRACT

A test apparatus for characterizing a device under test includes a test case generator, a test unit, a data storage unit, and a data analysis unit. The test case generator is configured to randomly generate a plurality of test cases, which include values of one or more input variables of a set of input variables. The test unit is configured to perform the plurality of test cases on the device under test. The data storage unit may store sets of test data, which are associated to the test cases and include values of input variables of a respective test case and corresponding values of output variables of the device under test related to the respective test case. The data analysis unit may further analyze the test data and is further configured to determine dependencies within a subset of variables of the test data to characterize the device under test.

17 Claims, 5 Drawing Sheets

(56) References Cited

U.S. PATENT DOCUMENTS

| | | | |
|---|---|---|---|
| 2007/0006046 A1 | 1/2007 | Overman et al. | |
| 2007/0162894 A1 | 7/2007 | Noller et al. | |
| 2008/0082968 A1 | 4/2008 | Chang et al. | |
| 2009/0119542 A1* | 5/2009 | Nagashima | G06F 11/261 |
| | | | 714/33 |
| 2010/0176815 A1 | 7/2010 | Roth | |
| 2011/0055645 A1* | 3/2011 | Inoue | G11C 29/56 |
| | | | 714/718 |
| 2011/0227767 A1 | 9/2011 | O'Brien | |
| 2013/0159774 A1* | 6/2013 | Budnik | G06F 11/3688 |
| | | | 714/33 |
| 2014/0137082 A1* | 5/2014 | Ellis | G06F 11/3664 |
| | | | 717/124 |
| 2014/0172347 A1* | 6/2014 | Gavish | G06F 15/00 |
| | | | 702/123 |
| 2014/0195870 A1 | 7/2014 | Ma | |
| 2014/0207710 A1* | 7/2014 | He | G06F 17/18 |
| | | | 706/12 |
| 2015/0186250 A1* | 7/2015 | Friedler | G06F 11/22 |
| | | | 717/124 |
| 2015/0186251 A1* | 7/2015 | Friedler | G06F 11/3672 |
| | | | 717/124 |
| 2015/0264590 A1* | 9/2015 | Michl | H04B 17/11 |
| | | | 455/67.14 |
| 2016/0072594 A1* | 3/2016 | Yuan | H04B 17/0085 |
| | | | 455/424 |
| 2016/0260030 A1* | 9/2016 | He | G06N 20/00 |
| 2017/0153958 A1* | 6/2017 | Parikh | G06F 11/24 |
| 2017/0228301 A1* | 8/2017 | Schinzel | G01R 31/31724 |
| 2017/0270020 A1* | 9/2017 | Haruki | G06F 11/2733 |
| 2018/0095861 A1* | 4/2018 | Fainekos | G06F 11/3604 |

\* cited by examiner

TEST APPARATUS AND METHOD FOR CHARACTERIZING A DEVICE UNDER TEST

CROSS-REFERENCES TO RELATED APPLICATIONS

This application is a continuation of copending International Application No. PCT/EP2017/055370, filed Mar. 7, 2017, which is incorporated herein by reference in its entirety.

BACKGROUND OF THE INVENTION

Understanding the performance limits of today's complex devices and programming and calibrating them such that they meet multiple specifications under all allowed operating and input conditions, while consuming minimum power, is a very complicated high-dimensional optimization problem, jointly faced by designers, firmware engineers, system engineers, and test engineers.

Current practice is that test engineers create and run a series of predetermined tests in response to specific information requests from designers and firmware & system engineers. When results are surprising, new tests are created to return additional requested plots. This process is time-consuming and prone to misunderstandings.

The current practice is a sequential process consisting of the followings steps
  (Designers or FW/system engineers) define what measurements to take under which conditions
  Test engineers create and debug the test
  Run the test
  (Designers or FW/system engineers) analyze the result. When they see unexpected results, they request more tests.

Essentially each test is designed to return a specific desired measurement or plot f(x) or f(x, y), implemented as nested loop over a few variables, where all other variables have fixed specified values.

This approach has several, increasingly important limitations
  Time consuming: Each iteration involves writing a new test, debugging it, and finally running it, before results are available.
  Error prone: Writing individual tests allows individual errors to creep in.
  Ambiguous: Axis labels tend to be inconsistent. Values of unchanged variables and measurement conditions tend not be documented well.
  Insufficient: The large number of variables (e.g. stimulus settings, device settings, operations conditions) renders a full N-dimensional sweep over all involved variables impossible. Engineers may restrict themselves to a small set of predetermined plots f(x), f(x, y), or with low-dimensional sweeps, where the remaining variables have predefined values.
  Partial results: When a nested loop aborts (power outage, contact problems, device dies, crash), chances are that the outmost loop variable has not yet changed and results are mostly unusable.
  Fools machine learning algorithms: Because defined tests reflect the engineers understanding of likely dependencies, machine learning algorithm can only operate on highly biased data, potentially leading to self-fulfilling prophecies.

Therefore, there is a need for an improved approach.

SUMMARY

According to an embodiment, a test apparatus for characterizing a device under test may have: a test case generator configured to randomly generate a plurality of test cases, wherein a test case has values of one or more input variables of a set of input variables; a test unit configured to perform the plurality of test cases on the device under test; a data storage unit configured to store sets of test data, wherein the sets of test data are associated to the test cases and wherein the sets of test data have values of input variables of a respective test case and corresponding values of output variables of the device under test related to the respective test case; a data analysis unit configured to analyze the test data, wherein the data analysis unit is further configured to determine dependencies within a subset of variables of the test data to characterize the device under test.

According to another embodiment, a method for characterizing a device under test may have the steps of: randomly generating a plurality of test cases, wherein a test case have values of one or more input variables of a set of input variables; performing the plurality of test cases on the device under test; storing sets of test data, wherein the sets of test data are associated to the test cases and wherein the sets of test data have values of input variables of a respective test case and corresponding values of output variables of the device under test related to the respective test case; analyzing the test data and determining dependencies between a subset of variables within the test data to characterize the device under test.

According to another embodiment, a non-transitory digital storage medium may have a computer program stored thereon to perform the inventive method when said computer program is run by a computer.

Embodiments show a test apparatus for characterizing a device under test. The test apparatus comprises a test case generator configured to randomly generate a plurality of test cases, wherein a test case comprises values of one or more input variables of a set of a set of input variables. Moreover, the test apparatus comprises a test unit configured to perform the plurality of test cases on the device under test. A data storage unit is configured to store sets of test data, wherein the sets of test data are associated to the test cases and wherein the sets of test data comprise values of input variables of a respective test case and corresponding values of output variables of the device under test related to the respective test case. Moreover, the test apparatus comprises a data analysis unit configured to analyze the test data, wherein the data analysis unit is further configured to determine dependencies within a subset of variables of the test data to characterize the device under test.

The present invention is based on the finding that it is advantageous to generate the plurality of test cases randomly. A random test case generation outperforms the deterministic or sequential test case generation, e.g. in terms of significance or informative value, at least for large data sets. For example, a device under test may be tested using the randomly created test cases. For large data sets, it is most likely that the duration of the test, started at the end of a working day, exceeds one night or even a weekend and that therefore, the test is still running in the morning of the next working day and therefore, results are not present. The same counts if the test is interrupted during processing, e.g. due to an error in the test routine or a power outage. Nonetheless, in contrast to known methods which fill a parameter space covering the results of the test in an organized, sorted or regular manner, for example one dimension after the other, the proposed device already covers a huge variety of the parameter space. However, the coverage may be not as dense as in the known approaches. This counts for those dimensions, where the parameter space is already filled regularly by the known approaches, wherein the coverage of those areas of the variable space, which is not already regularly filled by the known approaches may much denser. However, according to the invention, it is possible to determine dependencies or relations between all used variables of the test cases at an early stage of the test. Using one of the known approaches, dependencies on one or more of the used variables may not have been examined at the same test stage. Moreover, the proposed random test case generation provides the same results, only derived in a different order, than a deterministic approach, if the whole test is performed. Nonetheless, a huge amount of tests is aborted or interrupted during processing. In this case, the random test case generation outperforms the deterministic approach since variables of the random test case generation are nevertheless varied or have a high variation wherein in a classical nested loop for example, the variable of the outmost loop is varied comparably slowly.

A further benefit of the proposed approach of random test case generation is the error detection. Using the proposed approach, errors occur more often since the variable space is filled more quickly and it is more likely to hit or to detect an error (in the same time) when compared to the deterministic approaches. Moreover, since errors are usually dependent on more than one variable, the variation of (nearly) all variables within consecutive test cases increases the probability to detect errors (in the same time) when compared to a deterministic approach. This is of a high practical relevance. If a test is aborted during execution, a deterministic test may not detect an error wherein, wherein the random test case generation covers that area of the variable space with at least one test case and the error is detected and may be either further examined or directly fixed.

According to embodiments, the data analysis unit of the test apparatus may be configured to project a plurality of sets of test data, which make up an N-dimensional space of variables, onto an M-dimensional space of variables, wherein M<N, in order to determine the dependencies. This is advantageous, since dependencies between the variables of the test cases reveal information about specific scenarios which occur during the test of the device under test. This may be an error within the device under test which, for example, typically occurs at a certain temperature, voltage or electric current of a processing unit of the device under test. Hence, the temperature, voltage and/or current of the processing unit is one of the variables of the test cases. Moreover, this approach is advantageous for large data sets, where for example $M \leq 6$ and/or $N \geq 5*M$. In other words, a test set of more than 30 variables, which is difficult to analyze, is reduced to a maximum of six variables, which is much easier to analyze than a 30-dimensional space. However, the human perception may have difficulties to reveal dependencies, without technical support, in more than three dimensions. Therefore, according to further embodiments, the data analysis unit may be configured to use least absolute shrinkage or selection operator (LASSO) regression to analyze the test data. The data analysis unit may be configured to analyze dependencies within a subset of M variables within the test data. Using LASSO regression is advantageous, since the algorithm creates or calculates models of the test system, such as the device under test or components of the device under test, with a reduced number of variables. In other words, LASSO finds a good compromise between a highly accurate model by further limiting the space of variables to those variables which have a high influence on the model to ensure a high generality or applicability to new, unseen (test) data.

According to further embodiments, the set of input variables comprises at least one of an information describing a stimulating signal, or an information describing a condition under which the test is performed, or an information about a firmware setting of the device under test. In other words, any information relevant to characterize the device under test in a specific situation may be part of the test cases. This is advantageous to identify dependencies between these variables even for those variables or variable combinations where a dependency is not expected. In other words, random permutation of the input variables may use variable combinations which may have been omitted in a standard test scenario in order to derive results more quickly, since the whole test needs to be performed in the standard test scenario before results may be derived. Moreover, the inventive test unit may be configured to perform the plurality of test cases randomly on the device under test such that a space of values of variables of all sets of test data is randomly filled more and more by values of variables of a current and previous sets of test data. This is advantageous, since it enables a user to find dependencies between all variables at a very early stage of a test performance. Therefore, even a reduced test time, for example due to a scenario incurring or causing an error in the device under test, or a power failure, may result in a data set revealing sufficient information to find dependencies within the variables.

According to further embodiments, the test case generator is configured to generate the plurality of test cases by using at least one of a random permutation of a nested loop or random sampling of a space of values of the set of input variables. This is advantageous, since all possible occurring test cases are covered, even though they are listed or processed in a random order. Moreover, the test performer may be configured to perform the plurality of test cases during scheduling of multiple test tasks, wherein a test task comprises multiple test cases. In other words, test cases may be grouped into test tasks, parallely applied to the device under test using a scheduling algorithm such as e.g. round robin, to enable a (pseudo) parallel processing of the multiple test cases. The test tasks may be applied to different parts of the device under test, e.g. for testing different components of the device under test simultaneously. This is advantageous, since results of the tested parts of the device under test may be derived during one test procedure. If the test procedure is interrupted, at least a temporary result or a rough estimate of dependencies of the tested variables may be obtained. In other words, scheduling may be used to (pseudo) parallely test interesting parts of the device under test. This is advantageous, since for example in case of a power outage, at least a reduced set of information or output variables is present for all of the relevant parts of the device under test. Relevant parts of the device under test may be an emitting and a receiving circuit of e.g. a mobile phone.

According to further embodiments, the test case generator is configured to randomly generate a plurality of test cases, wherein the test case generator is configured to randomly generate values for the one or more input variables (operating parameters) within an operating range of the device under test for the one or more input variables. In other words, upper and/or lower bounds or limits of input variables may be defined for example by a user input or derived from previous tests on the device under test, for example to prevent the device under test from operating outside of an operating range. This may be for example an environmental temperature or an input voltage or current, wherein the device under test shall operate. The test case generator may be further configured to randomly generate the plurality of test cases using the one or more input variables of the set of input variables, wherein the test case generator is configured to restrict (the input variables) to a subset of the set of input variables such that the input variables meet one or more equality or inequality constraints. This is advantageous, since the test case generator may generate test cases within the (presumed) operating range of the device under test automatically. However, the operating range of the device under test may be defined by the constraints.

Further embodiments show the data storage unit configured to store a current set of test data directly after the current set of test data is created and/or wherein the data storage unit is configured to permanently store each set of test data. In other words, resulting data of the device under test is stored after each test case of the plurality of test cases is performed, to prevent the system from loss of data if the test is interrupted to stopped unexpectedly. Moreover, the storing may be performed on a permanent storage, such as for example a hard drive disk to prevent the system from data loss during a power outage.

Before embodiments are described in detail using the accompanying figures, it is to be pointed out that the same or functionally equivalent elements are given the same reference numbers in the figures and that a repeated description for elements provided with the same reference numbers is omitted. Hence, descriptions provided for elements having the same reference numbers are mutually exchangeable.

BRIEF DESCRIPTION OF THE DRAWINGS

Embodiments of the present invention will be detailed subsequently referring to the appended drawings, in which.

DETAILED DESCRIPTION OF THE INVENTION

In the following, embodiments of the invention will be described in further detail. Elements shown in the respective figures having the same or a similar functionality will have associated therewith the same reference signs.

Figure 1:
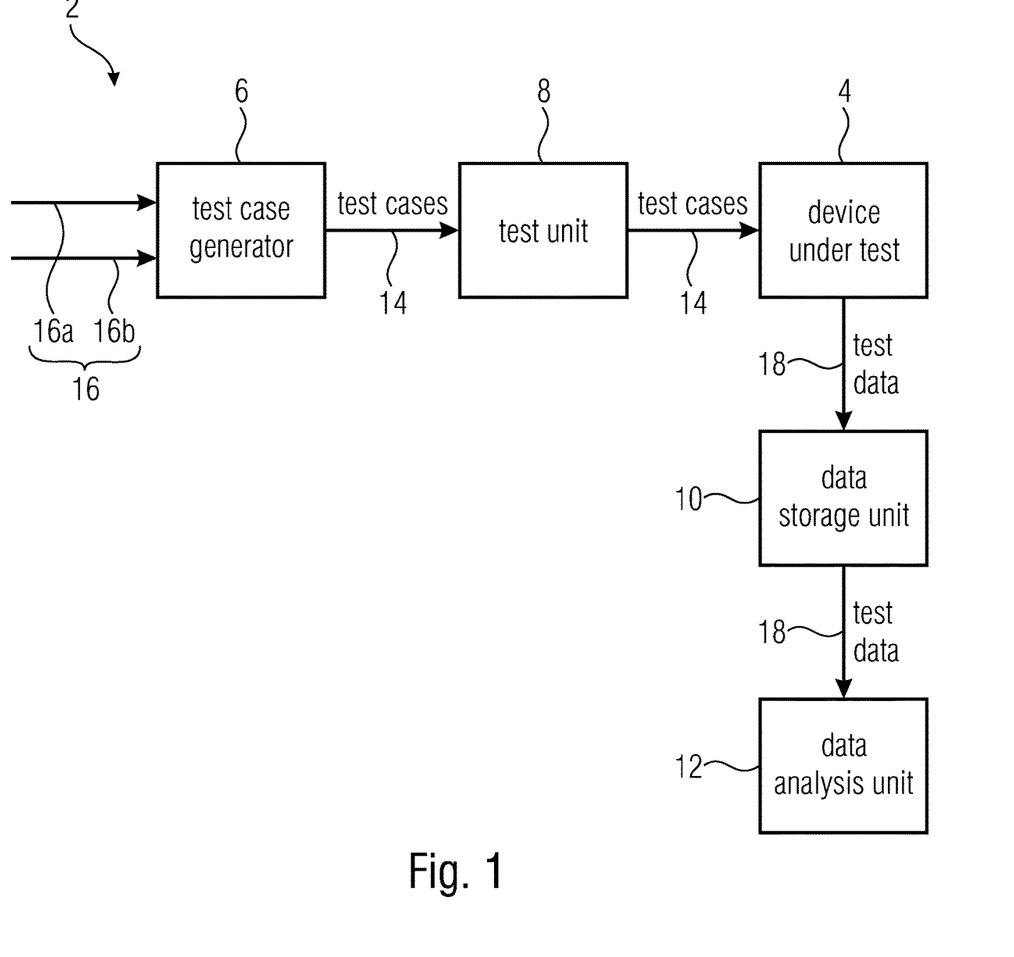
FIG. 1 shows a schematic block diagram of the test apparatus for characterizing a device under test.

FIG. 1 shows a schematic block diagram of a test apparatus 2 for characterizing a device under test 4. The test apparatus 2 comprises a test case generator 6, a test unit 8, a data storage unit 10, and a data analysis unit 12. The test case generator 6 is configured to randomly generate a plurality of test cases 14, wherein a test case 14 comprises values of one or more input variables 16a, 16 of a set of input variables 16. The test unit 8 is configured to perform the plurality of test cases 14 on the device under test 4. Moreover, the data storage unit may store sets of test data 18, wherein the sets of test data 18 are associated to the test cases 14 and wherein the sets of test data 18 comprise values of input variables of a respective test case and corresponding values of output variables of the device under test 4 related to the respective test case. The data analysis unit 12 may further analyze the test data 18, wherein the data analysis unit 12 is further configured to determine dependencies within a subset of variables of the test data 18 to characterize the device under test.

In other words, the data analysis unit 12 may determine a model of the device under test 4 using the test data 18 to predict, for future input variables, corresponding output variables. Therefore, a reduced subset of variables, especially of input variables, enhances the generality or the quality of prediction of the model up to the point, where the number of input variables contain insufficient or not enough information to characterize the device under test properly or sufficiently. Therefore, using LASSO regression may be advantageous, since LASSO regression proposes good or accurate models with a comparably low number of input variables. Other methods may be ridge regression or other shrinkage methods, least squares regression, or subset selection.

The test case generator 6 may generate the plurality of test cases 14 by using at least one of random permutation of a nested loop or random sampling of a space of values of the set of input variables. Moreover, other methods for randomly determining test cases may be used instead. However, it is advantageous that each permutation of variables or each test case is unique within the plurality of test cases, since the same input parameters should lead to the same output values and therefore to not provide any further information. Therefore, the device under test may consider an operating range of the device under test and corresponding ranges of the input variables. The operating ranges of the input variables may be limited or, in other words, the test case generator may restrict one or more of the input variables to a subset of values of the respective input variables, such that the input variables meet one or more equality or inequality constraints. Using an equality constraint, an input variable is set equal to one or more values wherein an inequality constraint defines a lower or upper border where values of the input variable have to be located.

Moreover, according to embodiments, it may be used a combination of random and deterministic test case generation, e.g. referred to test case generation with integrated optimization. Therefore, a first set of variables of the test case may be deterministically derived, e.g. by splitting the range of values of one variable into an equal number of subsets and by taking one value of each subset. A second set of variables may be randomly assigned to the first set of variables. This may be performed to optimize the variables regarding the first set of (deterministically derived) variables. In other words, a discrete variable such as e.g. a Boolean variable may be varied or permutated deterministically, wherein further (discrete or non-discrete/continuous) variables are randomly applied to the current deterministically varied variable to form a current test case. In case of a Boolean variable, two consecutive test cases may comprise the same values of input variables except of the discrete, deterministically varied (Boolean) variable which is true in a first test case and false in a second test case. This may be applied to more than one deterministically varied variable per test case or to further discrete variables which may have more than two (possible) states.

Using automated test equipments (ATE), compared e.g. to bench instrumentation, is advantageous since automated test equipments comprise tools for analyzing the test data, are faster than bench, automatically generate test cases, and may process many (types of) devices under test using handler interfaces. Therefore, ATE provide faster insight during characterization, debug, calibration, performance optimization, and test selection and thus improves time to market. Moreover, automated test equipment provide fast measurements of many devices when compared to bench instrumentation. The proposed test apparatus or method is especially advantageous when using complex parametric behavior, many operating modes, complex correction or calibration, and/or pursuing complex optimization goals. Therefore, radio frequency (RF) transceivers have many modes, bias settings, ranges, lots of corrections, are characterized by many performance measurements, and shall minimize power consumption. Moreover, HSIO (High-Speed Input-Output) interfaces include digital equalization, pre-emphasis, and bias settings to optimize bit error rates and minimize power. Other examples are analog circuits, mixed-signal blocks, or power management. The described properties or options of devices under test are examples for possible input variables 16 applied to the device under test, wherein values of the input variables, advantageously of all input variables, are stored in the data storage unit 10.

Figure 2:
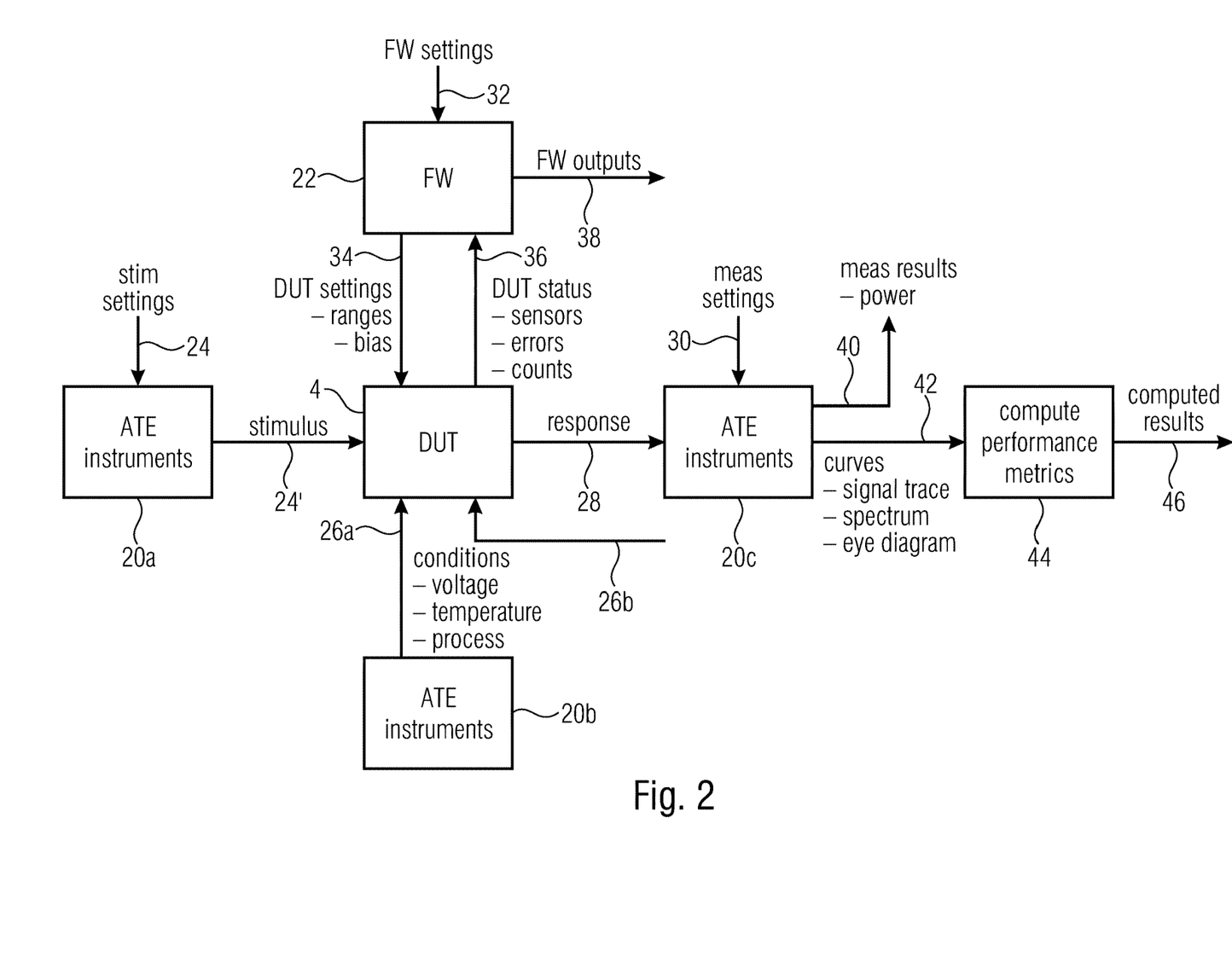
FIG. 2 shows a schematic block diagram of the device under test with related input and output variables.

FIG. 2 shows a schematic block diagram of a device under test 4 with associated input and output variables. The information revealed from the input and output variables is related to characterization, calibration, (performance) debug, firmware optimization and test selection. This is described in detail in the following. However, FIG. 2 shows the device under test 4 which is connected to instruments 20a, 20b, 20c of the automated test equipment and an internal or external firmware processor 22. The instrument 20a may derive stimulating settings 24 from the test cases 14 to provide a stimulus signal 24' to the device under test. The instrument 20b may set conditions 26a, such as an operating voltage, to the device under test. Further conditions 26b, which may not be applied to the device under test by instruments, such as for example a temperature of the environment, may further influence the device under test 4.

The device under test 4 may provide a response 28, such as the output variables or the test data to the instrument 20c. Input to the instrument 20c is further a measurement setting 30. This may be a setting for single or continuous measurements during test or while the test case is applied. If continuous measurement is applied, a further parameter may be an averaging method to derive a discrete value for the current test case.

Moreover, the device under test 4 may be connected to the firmware processor 22. The firmware processor 22 may be part of the device under test, however, for testing purposes, the firmware may run on a separated processing unit, where an optimization or debugging of the firmware may be more easily applied, e.g. by simply replacing the firmware processing unit. However, the firmware processor 22 may be fed with firmware settings 32 from the test cases. Using the firmware settings 32, the firmware processor 22 calculates settings 34 for the device under test, such as ranges or biases. The device under test provides status information 36 to the firmware processor 22, such as for example sensor information, errors, or counts. The firmware processor 22 may output this information as a signal 38.

A direct output of the instrument 20c is the measurement results 40, such as for example a power of the device under test. However, the instrument 20c may further provide curves 42 such as signal traces, spectra, or eye diagrams to a performance metrics processor 44. The performance metrics processor 44 is configured to compute performance metrics 46 as a computed result of the test performed on the device under test 4. The computed results 46 may be, according to an embodiment, further input to the test case generator 6 to improve the test cases.

In other words, devices that pass production tests shall meet multiple specifications for all allowed stimuli, device settings and operation conditions, often at minimum power consumption, with appropriate device settings, including calibration. Optimum FW that determines the best device settings is a very important part of the solution.

This is a high-dimensional optimization problem of a mix of continuous and discrete variables and a mix of continuous and discrete optimization targets.

Generally this involves several subtasks.

Characterization is the basis for several further steps. Characterization provides a (complete) (statistical) understanding of how performance metrics (1) depend on input stimuli, known operating conditions, and device settings, and (2) vary across process variations or unknown operating conditions. A large number of influencing parameters make this a very challenging task. Exhaustive sweeps over more than a few parameters are not practical.

Calibration (or correction) exploits performance dependencies on settings or known conditions for adjustments to improve performance. It is not trivial to decide which parameters should be adjusted as a function of which other parameters.

Problem debug identifies device settings and conditions that are not handled correctly and that should be corrected in the next chip or avoided by FW.

Performance debug identifies device settings, conditions and stimuli where performance degrades. FW can try to avoid these cases.

FW optimization determines the best device settings as a function of intended behavior and measurable information that achieve the best (worst case) specifications (often at minimum power consumption).

Selection of production tests identifies a minimum set of tests that are sufficient to decide whether a given device will meet all specifications for all allowed stimuli and operating conditions, when calibrated and programmed appropriately.

Figure 3:
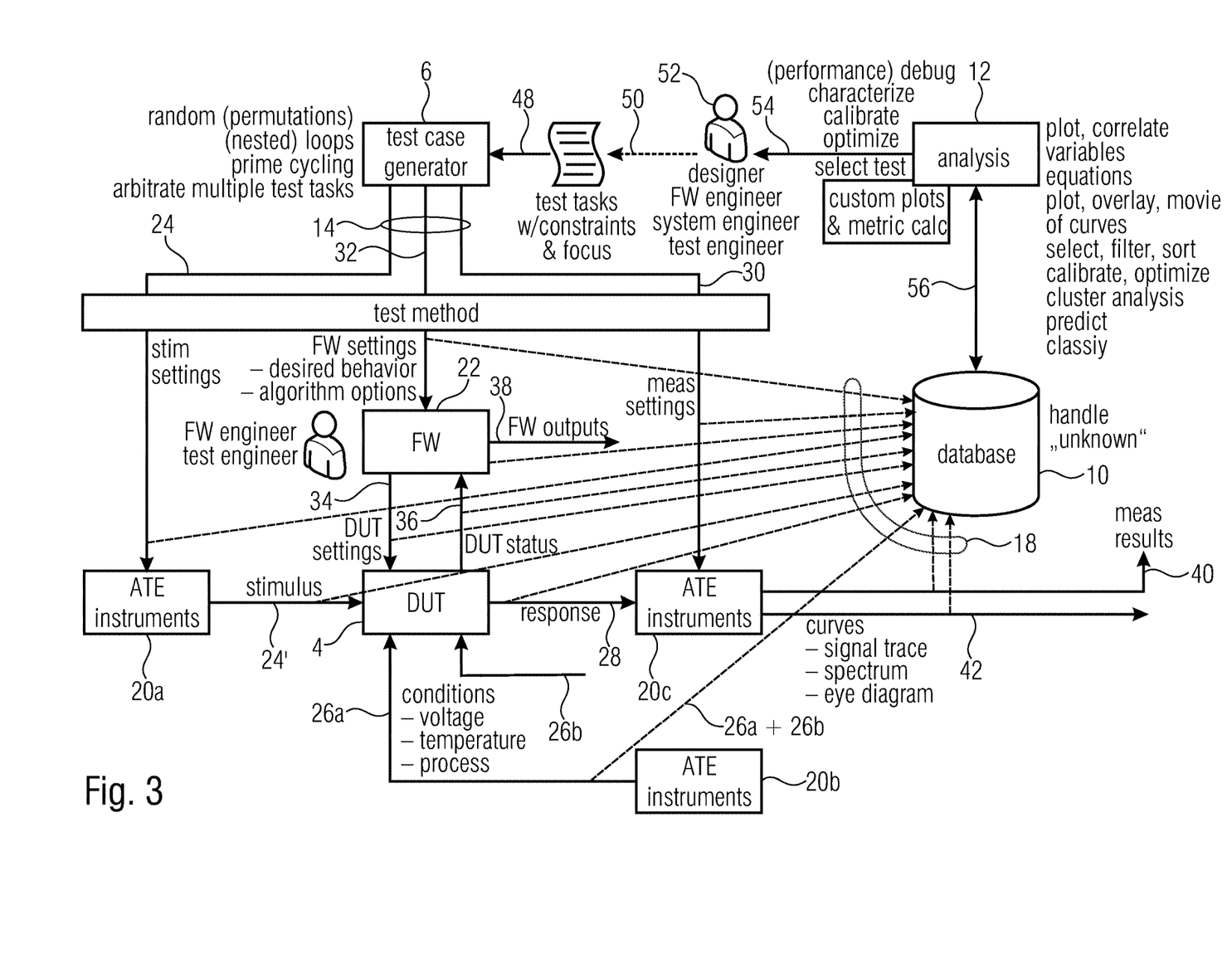
FIG. 3 shows a schematic block diagram of the test apparatus according to an embodiment.

FIG. 3 shows the setting of FIG. 2 in the environment of the test apparatus 2, however omitting the performance metrics processor 44 for simplicity. Furthermore, FIG. 3 exhibits the test case generator 6 which may generate test cases from test tasks with constraints and focus 48. Using the constraints, the test case generator may calculate thresholds or borders of the input variables, for example, based on an operating range of the device under test. The test tasks may define a set of test cases, wherein a test task may comprise test cases for a specific part or element of the device under test. Moreover, different test tasks may comprise different constraints, since, to give an example, different components or parts of the device under test may be able to handle different input voltages and therefore, constraints for those different test tasks take these different boundaries into consideration. The test tasks may be input 50 by a designer, firmware engineer, system engineer, or test engineer 52, for example based on earlier or previously performed tests on the device under test.

Moreover, FIG. 3 indicates a data base, such as the data storage unit 10. Input into the database is the test data 18 comprising any input and output variable of a current test case applied to the device under test. A current test case may also be referred to as a test method or a test scenario. Each test case generates one point in a multi-dimensional variable space. The dimension of the multi-dimensional variable space is equal to the number of variables of the test data 18.

According to embodiments, the database 10 may be fed, for example overnight, with a huge number of automatically generated directed (randomized) test cases. Then, designers, firmware and system engineers (without automatic test equipment knowledge) can conduct ad hoc offline analysis experiments by retrieving plots from the database.

Powerful generic machine learning algorithms provide fast insight. Prediction algorithms identify dominate performance dependencies, classification identifies problematic situations, cluster analysis separates multiple problems. Min-max optimization performs and evaluates calibration or firmware optimization.

The data analysis unit 12 may, for example based on an input 54 by a person 52, calculate dependencies in the variables of the test data 18 based on multiply performed test cases. Therefore, the data analysis unit 12 is connected to the database 10 via connection 56.

In other words, fast test execution on ATE enables a new brute-force approach.

According to embodiments, the test apparatus randomizes all influencing variables (input signals, FW settings, FW algorithm options, device settings, operating conditions, etc) and measure everything possible (instruments, on-chip sensors, flags, FW status) for each combination and store it in a test data base for offline analysis.

Analysis functions extract relevant debug info based on expressions of multiple measurements and modes.

Now designers and FW & system engineers 52 can conduct offline experiments by filtering appropriate data sets, interactively create previously unconceived plots, and employ powerful machine learning algorithm to obtain fast insight into dependencies.

Pre-silicon, test engineers create highly parameterizable test methods, which give control over allowed combinations of stimuli 24', DUT settings 34, operating conditions 26a, 26b, FW settings 32 (desired behavior, algorithm options). As part of this effort, FW engineers may implement a FW layer 22 that sets up the device as a function of desired behavior and equally parameterizable or randomizable algorithm options. These test methods also gather as much information about the DUT and its behavior as possible, including sensor data and on-chip status information.

Custom analyses functions that operate on measured curves return custom plots and compute application specific performance metrics and indicators for debugging, e.g. spectrum with spur identification.

The team also defines (more or less random) variations of variables for initial testing in the form of multiple test tasks with constraints and focus areas.

As soon as silicon arrives, testing starts on several devices and fills the test data base.

Shortly later, engineers can start analyzing the first data using offline analysis tools.

Continuing (random) tests increase coverage progressively, allowing more comprehensive analysis.

When certain parameter combinations appear interesting, the focus can be redirected towards these more interesting combinations by adding or changing test tasks. These additional tests are added to the same data base.

When the test method or FW needs to be changed, new data is added along with version information to the same database so that results before and after the change can be compared.

Figure 4:
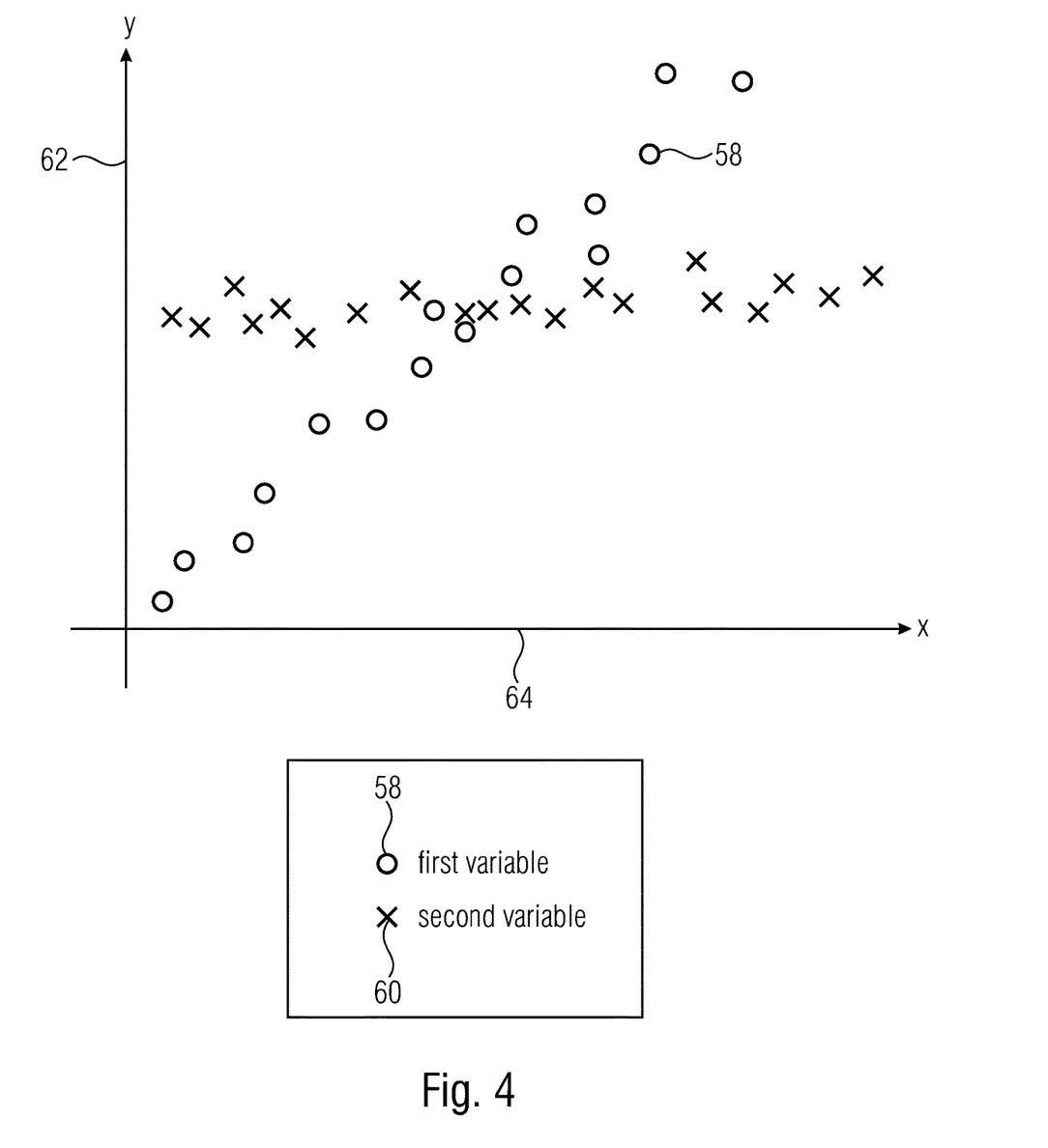
FIG. 4 shows a schematic 2-dimensional scatter plot exemplary depicting a representation of two different variables.

FIG. 4 illustrates a schematic scatter plot showing a first variable (or parameter) 58 indicated by circles and a second variable 60 indicated by crosses. Input values of the first and the second variable applied to the device under test may be assigned to the x-axis 62 wherein associated output values of the device under test may be assigned to the y-axis 64. Therefore, dependencies between the first and the second variable to the output value are indicated. Regarding the first variable 58, the plot exhibits a (linear) dependency of the variable to the output, since the values of the first variable are located alongside a (best fit) straight line. However, the second variable 60 does not indicates a dependency to the output. A variation of values of the second variable 60 (alongside the x-axis 64) do not result in a change of the output of the device under test (alongside the y-axis 62).

FIG. 4 shows a 2-dimensional variable space for each input variable, which may be derived by selecting one input variable or input parameter and one output (value or parameter) of the device under test from a (potentially) larger amount of input and output variables. This may be also referred to a projection of the high-dimensional variable space into a (2-dimensional) plane. The selection may be performed to evaluate dependencies between the input variables and the output variable e.g. as indicated above. However, this procedure may be adapted to higher variable spaces as well, indicating dependencies between the variables. In other words, the data analysis unit 12 is configured to project a plurality of sets of test data, which make up a N-dimensional space of variables, onto a M-dimensional space of variables, wherein M<N, in order to determine the dependencies. Therefore, it may be M≤6 and/or N≥5*M.

Figure 5:
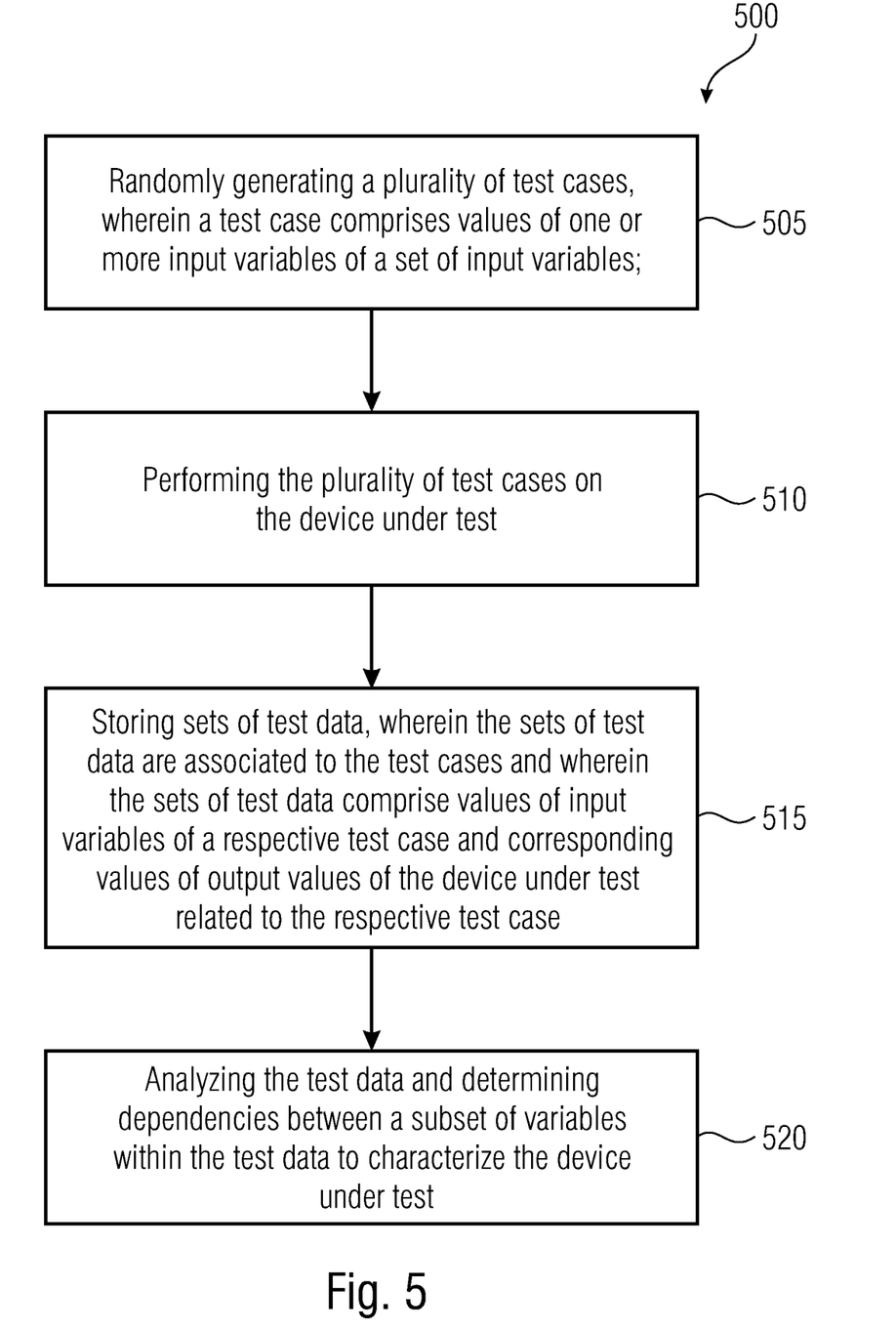
FIG. 5 shows a schematic flowchart of a method for characterizing a device under test.

FIG. 5 shows a schematic flow diagram of a method 500 for characterizing a device under test. The method 500 comprises a step 505 for randomly generating a plurality of test cases, wherein a test case comprises values of one or more input variables of a set of input variables, a step 510 of performing the plurality of test cases on the device under test, a step 515 of storing sets of test data, wherein the sets of data are associated with the test cases and wherein the sets of test data comprise values of input variables of a respective test case and corresponding values of output values of the device under test related to the respective case, and a step 520 of analyzing the test data and determining dependencies between a subset of variables within the test data to characterize the device under test.

The following sections describes the goal of several tasks, their challenges, and how tools can help.

Debug Problems

The first step, called validation, is to determine whether combinations of variable values (stimuli, conditions, settings) exist that lead to errors. Then, if such combinations exist, a rule for possible occurrence of errors should be created, as a first step towards understanding the root cause.

Challenges

How to ensure sufficient (predictable) coverage to find problematic variable combinations, if they exist?

How find which fewest variable combinations can predict an error condition in a high-dimensional search space?

It is extremely difficult to separate multiple overlaid problems.

An error condition can be hard to detect, when it reveals itself as an unusual combination of multiple results.

Helpful tools

Automatic test case generation covers the target variable space widely. Test case generation with prime cycling through variable values ensures predictable and growing coverage in high-dimensional search spaces.

Basic analysis tools: Plotting arbitrary f(x), correlations, filtering, equations, selection linked across plots.

Outlier detection identifies seldom unusual behavior.

Cluster analysis separates cases with different root causes. Filtering then allows analyzing them one by one.

Classification algorithms (e.g. binary decision diagrams) return the most influencing variables for a given problem.

Debug Performance

The goal is similar to problem debugging, but problematic cases are described by a gradual deviation of a continuous variable rather than a binary criteria.

Describe which variable combinations lead to performance deviations

Describe how the amount of performance deviation depends on other variables Challenges How to ensure sufficient (predictable) coverage to find problematic variable combinations, if they exist?

How to find which fewest variable combinations can predict performance degradation in a high-dimensional search space, both in terms of occurrence and intensity?

It is extremely difficult to separate multiple overlaid problems.

Helpful tools

Automatic test case generation covers the target variable space widely. Test case generation with prime cycling through variable values ensures predictable and growing coverage in high-dimensional search spaces.

Basic analysis tools: Plotting arbitrary f(x), correlations, filtering, equations, selection linked across plots Outlier detection identifies seldom unusual behavior.

Cluster analysis separates cases with different root causes. Filtering then allows analyzing them one by one.

Prediction algorithms with subset selection (e.g. LASSO regression) return the most influencing variables.

Characterize

The goal is to understanding quantitatively how performance metrics depend on stimuli, settings and conditions and how they vary with process and unknown operating conditions.

Challenges

Multi-dimensional dependencies are hard to extract from conventionally used 2- or 3-dimensional plots.

How to find which fewest variables are sufficient to understand performance dependencies in a high-dimensional search space?Helpful tools Plots of arbitrary variables, movie of curve vs variable General prediction algorithms return a quantitative performance model.

Feature selection algorithms identify the smallest set of model input variables that may be used.

Calibrate/Correct

The goal is to find which variables should be corrected how much as a function of which other variables to achieve the best (worst case) performance. General vs device-specific correction may be decided.

Challenges

How to find most effective pair of dependent and independent variables for calibration?

Calibration should be implemented, debugged, and run on many devices before effectiveness can be judged.

Helpful tools

Feature selection algorithms identify the smallest set of most influencing variables as candidates for which variables (y) to correct as a function of which other variables (x).

(Min-max) optimization algorithm finds the best calibration function y(x) that achieves the best (worst case) performance, where x and y can each include multiple variables.

Visualize effectiveness of calibration by selecting test cases that satisfy y(x).

Perform calibration by applying a filter related to y(x).

Compare multiple emulated calibration schemes.

Optimize FW The goal is to determine the best FW algorithm options and best device settings as a function of known settings and conditions to achieve best (worst case) performance metrics. This is similar to calibration but often involves multiple discrete variables.

Challenges

How to find which settings should be modified as a function of which other variables?

How to find optimal setting values as a function of most influencing variables?Helpful tools Feature selection algorithms identify the smallest set of most influencing variables as candidates for which variables (y) to correct as a function of which other variables (x).

(Min-max) optimization algorithm finds the optimal setting or optimal setting function y(x) that achieves best (worst case) performance, where x and y can each include multiple variables.

Decision trees can be useful as dense representations of the optimal function y(x).

Emulate the effect by applying a filter related to y(x).

Visualize the effectiveness by selecting test cases that satisfy y(x).

Compare multiple emulated schemes.

Select Production Tests

Find a subset of tests of minimum cost that is sufficient to make a reliable enough pass/fail or binning decision.

Challenges

Very high desired quality levels involve extremely seldom misclassifications.

Very unequal cost of misclassifications, i.e. cost of lost die vs. cost of escape.

Unequal cost of tests Helpful

Cost-driven classification algorithm.

Data Base

The data base is basically a huge table, possibly with millions of test cases (rows), where each test case can include thousands of scalar variables (columns, shortly called variables) and links to dozens of curves.

The content abstracts from ATE and test method details, with the intention to be usable for designers, FW & system engineers.

Examples of scalar variables are

Device type, version, ID, lot ID, ATE ID

Test method version, FW version

Stimulus settings

FW settings

FW outputs

Device settings

Device status

Operating conditions: Temperature, supply voltages

Process parameters

Measurement settings

Measured results

Results from custom analysis of curves

Expression variables computed from other variables or curves

Built-in variables are

Date & time

Test case ID
Error occurred?
Test case selected?
Pass/fail result, result bin
Examples of curves are
Scope trace
Waveform (also stimulus)
Spectrum
Phase noise spectrum
Eye diagram
Scalar Variables
Variable values can be of different types.
Real number
Integer
Boolean
Categorical with describing string (predefined choices)
Date & time
String
To enable readable plots and analysis each variable has the following properties:
Understandable name
Short symbol for plot axis labels
Source: FW setting, DUT setting, DUT status, measured result, . . .
Is input? (can be set by automatic test case generation)
Data type: real number, integer, Boolean, categorical string, string
Physical unit
Printing format
Description, e.g. expression that defines it
Default value, can be 'unknown'
Value, can be 'unknown'
Allowed value range (limits or list of value choices)
Optional specification limits
Quantization options for optimization [1]
A list of all scalar variables with above properties can be created.
Curves
Each curve consists of a (not necessarily ordered) list of (x, y) pairs.
To enable readable plots and analysis, each curve has the following properties:
Name of curve
Descriptive x and y axis labels
Short symbols for x and y axis
Physical units for x and y
Linear or logarithmic x and y axis
. . .

It should be possible to add or remove curves to/from an existing data base. New curve values of existing test cases are set to 'unknown'.

A list of all curves with above properties can be generated.

Expandability, Unknown Values

It is possible to add variables or curves to an existing data base when a new variable seems relevant after a while. Variable values of existing tests can be set to a default value or to 'unknown'.

E.g. when a blocking capacitor is added to the load board, a new variable 'BlockingCap' can be added with default 'None' to indicates that old test cases had no capacitors. For new test cases, the value will be set to 'Yes'.

Automatic Test Case Generation

This tool creates a series of test cases based on one or multiple test tasks that are created at a high level of abstraction, which is meaningful to designers, FW & system engineers.

Simple test tasks can just request a series of variable shmoos.

A single test case is defined by a combination of input variable values, such as stimulus settings, FW settings, device settings, operating conditions, and devices, i.e. by a point in a high-dimensional variable space. A 'date & time' variables ensure uniqueness also for repeatability tests.

Varied variables can be numeric or categorical.

A test task defines the
Targeted variable subspace (limits or value lists, constraints for allowed variable combinations)
A method for generating input variable combinations, i.e. sampling the targeted subspace
Equations for other dependent input variables
A criteria for stopping the test task
Multiple test tasks can be interleaved with defined relative occurrences. When allotted tester time is over (or a power outage occurs, or the DUT dies) obtained partial results are still usable.

Targeted Variable Subspace
By default, a variable assumes its default value.
Individual variable value ranges can be specified as
Min & max limit (for numeric data types), or list of choices with optional probabilities
Optional distribution for sampling values: E.g. uniform, Gaussian, one sided distribution
Users can specific constraints on combinations of variables using Boolean expressions.

Generating Input Variable Combinations
Multiple methods for sampling the input variable subspace are prepared.

| | Explicit list | Nested loops | Random sampling | Prime cycling |
|---|---|---|---|---|
| Coverage | Directed | Directed | Wide | Wide |
| Predictable N-coverage | NA | No | No | Yes |
| Number of variables | NA | Limited to a few | Unlimited | Virtually unlimited |
| Value ranges | NA | List of choices | List of choices or random values | List of choices |
| Result after abort | NA | Usable | Usable | Usable |
| Redundancy/overhead | No overhead | No overhead | No overhead | Some overhead |

Predictable N-coverage means that all combinations of N arbitrary variable values are covered.

NA stands for 'not applicable'.

Test cases that do not meet user specified constraint expressions are skipped.

Explicit List

For this simplest method, the user provides an explicit list of variable combinations, i.e. a table, that is executed sequentially. This method can also be used to link to user defined test case generation.

Nested Loops

The user provides value choices for a few variables e.g. with N1, N2, N3 choices. This test task generates all N1×N2×N3 combinations of variable values.

| Test case | Variable 3 (3 choices) | Variable 2 (2 choices) | Variable 1 (2 choices) |
|---|---|---|---|
| 1 | A | Low | On |
| 2 | A | Low | Off |
| 3 | A | High | On |
| 4 | A | High | Off |
| 5 | B | Low | On |
| 6 | B | Low | Off |
| 7 | B | High | On |
| 8 | B | High | Off |
| 9 | C | Low | On |
| 10 | C | Low | Off |
| 11 | C | High | On |
| 12 | C | High | Off |

Optionally, all combinations are executed in random order (random permutation of sequence) so that partial results are useful.

| Permutated Test Case | Original Test Case | Variable 3 (3 choices) | Variable 2 (2 choices) | Variable 1 (2 choices) |
|---|---|---|---|---|
| 1 | 12 | C | High | Off |
| 2 | 10 | C | Low | Off |
| 3 | 2 | A | Low | Off |
| 4 | 8 | B | High | Off |
| 5 | 9 | C | Low | On |
| 6 | 3 | A | High | On |
| 7 | 7 | B | High | On |
| 8 | 4 | A | High | Off |
| 9 | 1 | A | Low | On |
| 10 | 5 | B | Low | On |
| 11 | 6 | B | Low | Off |
| 12 | 11 | C | High | On |

Random Sampling

The user provides value choices or value limits for each varied input variable. Test case generation just picks random values for each variable, yielding random variable combinations.

Prime Cycling

The user provides value choices for each varied input variable. Test case generation pads the choices such that their lengths are mutually prime and then cycles through all choice lists.

| Test case | Variable 3 (5 choices) | Variable 2 (3 choices) | Variable 1 (2 choices) | Notes |
|---|---|---|---|---|
| 1 | A | High | On | |
| 2 | B | Medium | Off | All values of variable 1 occured |
| 3 | C | Low | On | All values of variable 2 occured |
| 4 | D | High | Off | |
| 5 | E | Medium | On | All values of variable 3 occured |
| 6 | A | Low | Off | All combinations of vars 1&2 occured |
| 7 | B | High | On | |
| 8 | C | Medium | Off | |
| 9 | D | Low | On | |
| 10 | E | High | Off | All combinations of vars 1&3 occured |
| 11 | A | Medium | On | |
| 12 | B | Low | Off | |
| 13 | C | High | On | |
| 14 | D | Medium | Off | |
| 15 | E | Low | On | All combinations of vars 2&3 occured |
| 16 | A | High | Off | |
| ... | ... | ... | ... | |
| 30 | E | Low | Off | All combinations of vars 1&2&3 occured |
| 31 | A | High | On | |
| ... | ... | ... | ... | |

This algorithm works progressively on all pairs, triples, N-tuples simultaneously with computable coverage for all N-tuples.

Optimization

Test cases are generated iteratively based on previous test case results by adapting multiple variables until a given optimization target is optimized.

Optionally, intermediate optimization steps generate test cases, otherwise only the final optimization result is stored as test case.

Analysis

Analysis is done offline (independent of ATE) by designers, FW & system engineers based DUT-related variables, without knowledge of ATE on a tool that has no direct connection to ATE.

Analysis capabilities range from simple x-y plots to sophisticated machine learning algorithm.

General Requirements

All analysis supports (whenever possible) numeric and categorical variables.

All analysis plots, filters, algorithms should be able to handle 'unknown' values of variables and curves in an intelligent way. E.g. a plot x-y plot with color should exclude all test cases where either x or y or the color variable is unknown.

All analysis refers the currently filtered subset of test cases.

All plots have meaningful axis labels and scaling, e.g. in engineering units such as 'MHz'.

Plots can be annotated with filter name (with optional expression), selection name (with optional expression), common variable values across the current selection, and values for a given variable list.

By default plots are linked to the current selection and current filter. Selecting test cases in one plot automatically updates highlighting in other plots. Filtering is typically applied to all plots. The link can be broken to compare different selections or different filters.

Data from all plots can be exported, e.g. to Excel.

Bitmap copies of plots can be generated easily for documentation.

Multiple plots can be managed on the screen.

Lists of Variables

Variables lists are useful to restrict attention to a subset of variables, e.g. when generating multiple plots, to not overload plot annotations, or to constraint machine learning.

Multiple named lists of variables are maintained.

Distributions

This plot shows histograms and/or cumulative distributions for a list of variables.

Each distribution is annotated with minimum, maximum, mean, standard deviation, number of different values, and percentiles.

Scatter Plots

This will be the most commonly used plot tool. It is useful to understand simple dependencies and correlations.

This tool generates N×M scatter plots of test cases for N different x-variables, M different y-variables, and optional marker, color, and z-variable (3D plot). Optionally, annotation includes correlation coefficients.

When x-variable and y-variable are equal, a distribution (cumulative or density) is generated.

Single Curve Plot

A generic plot y(x) is provided for a given curve measurement.

A user (typically design engineer) can create a custom plot function for a given curve that replaces the generic curve plot.

Plot for Combined Curves

Generic plotting of curves (same type) from multiple test cases is provided with the following methods for combining them:

Overlay, optional color for one variable 3D waterfall plot

Ensemble statistics: One curve y(x) per min, max, mean, mean±k*StandardDeviation, N-percentile Plot Curves as Function of Variable Test cases are first sorted by a specified variable.

A slider varies the sort index, updating the curve plot interactively to allow investigating the curve behavior as a function of this variable.

A movie can be created.

Custom Curve Plot and Analysis

A user (typically design engineer) can create one or more custom plot functions for a given curve that replaces the generic curve plot.

A user (typically design engineer) can create a custom analysis function for a given curve that can return multiple result variables. This analysis function has access to all other variable values of the same test case. Its results become part of the test case data base.

Example: Spectrum plot with highlighted identified spurs and analysis function that returns identification, power and frequency of the largest spurs.

Expression Variables

Expressions are useful to filter test cases or to transform multiple variable values into a more meaningful form. E.g. showing the voltage amplitude may be more insightful than showing low level and high level.

Expressions can operate on other variables (that are earlier in the list to avoid cyclic references) and on curves. Evaluating an unknown value generally returns an unknown result. Expression variables can be created based on above mentioned expressions. Once created and evaluated, they behave as all other variables in the data base.

A list of multiple named expressions is maintained. The "always true" expression is built-in.

Expressions in expression variables can be changed, updating the data base.

Selection

Selected test cases are highlighted in all plots. Selections are e.g. helpful to see commonalities and differences of problematic test cases.

Test cases can be added or removed from the current selection by

Click on individual test

Range of any variable

Draw arbitrary close shape around tests in any plot

Boolean expression referencing variables, e.g. from user, calibration algorithm, optimization algorithm, or cluster analysis The first N or last N test cases after sorting Statistics across the selected test cases are useful to judge test coverage and identify critical performance variables. It shows the following statistics for a selected named list of variables across the current selection of test cases:

Min, max, mean, standard-deviation (if numeric)

Number of different values

Percentiles (if numeric), percentages numbers can be specified Variables with equal value across the selection are identified.

Filter

Filters are e.g. helpful during debugging to focus on a certain symptom.

A filter can be defined by

The current selection of test cases

A (named) Boolean expression

The first N or last N test cases after sorting

A list of named filters is maintained.

Sort

Sorting is helpful to focus attention to the best or worst test cases.

The data base can be sorted by any variable in ascending or descending order. Optionally, the first N or last N test cases are selected or filtered.

Cluster Analysis

Cluster analysis is useful to split test cases into subgroups with different behavior.

The user specifies a list of (result) variables and receives a filter for each identified cluster.

Outlier Detection

Outlier analysis is useful to identify individual test cases with statistically unusual behavior.

The user specifies a list of variables whose (combinations of) values are analyzed.

Mahalanobis distance is a simple metric, applicable to numeric variables.

Feature Selection, Most Influencing Variables

Feature selection algorithms identify the smallest subset of variables that influence a given investigated (performance or error) variable most.

This is helpful during debugging, calibration, correction, FW optimization, and selection of production tests.

Scatter plots and correlation coefficients are the most basic tool for this purpose.

For categorical error variables, some classification algorithms, such as decision trees identify the most influencing variables.

For numeric performance variables, regularized (e.g. LASSO) regression returns the most influencing variables.

Classification, Explain Problem

This tool helps to understand under which conditions (combination of variables) a problem occurs, which is described as categorical variable. This is useful for debugging.

Classification algorithms return a model that predicts which variable combinations will lead to an error. The model is returned as prediction variable and/or in a computer readable form as equations, table, or other format, depending on algorithm type.

Examples are
Decision trees (result is easy to interpret)
Neural networks
Logistic regression
Support vector machines (SVM)
LASSO regularized regression (performs implicit feature selection)

Depending on the algorithm, independent variables can be identified automatically, or should be specified.

Prediction, Explain Performance

This tool returns a prediction model for a numeric performance variable as a function of multiple independent variables. The model is returned as prediction variable and/or in a computer readable form as equations, table, or other format, depending on algorithm type.

This is useful for calibration, correction, and performance optimization.

Examples are
LASSO regularized regression (performs implicit feature selection)
MARS regression
Neural networks Depending on the algorithm, independent variables can be identified automatically, or should be specified.

Optimization, Calibration

This tool finds the best values of variables in one list as a function of variables in another list that optimizes a given target variable.

This is useful for calibration, correction, or FW optimization.

It returns a Boolean expression that is true when the optimality condition is met. Performing calibration or optimization is equivalent to applying a filter based on this Boolean expression.

It also returns a multi-dimensional (calibration) table for each corrected variable and another table with the achieved performance.

Production Test Selection, Cost Driven Classification

This tool identifies the lowest cost subset of production tests that minimizes the sum of test cost, cost of escapes, and cost of yield loss.

Note, in this context a production test refers to a result variable.

Further embodiments of the invention relate to the following examples:

1. (Automatically) generate test cases by sampling a high-dimensional input variable space, execute the generated test cases, store all input and output variables in a test data base (table), and then analyze offline to gain insight.
2. Test case generation with integrated optimization
3. Test case generation with randomized algorithm choices in FW
4. (Pseudo-)random permutations of nested loop
5. Arbitration (e.g. round robin) of multiple test tasks
6. Optimization in existing data base
7. Calibration implemented as test case filter
8. LASSO regression to identify small set of influencing variables Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A test apparatus for characterizing a device under test, the test apparatus comprising:
    a memory;
    a processor coupled to the memory and configured to:
    generate a plurality of test cases, wherein a test case comprises values of one or more input variables of a set of input variables;
    perform the plurality of test cases on the device under test;
    store sets of test data, wherein the sets of test data are associated with the plurality of test cases and wherein the sets of test data comprise values of input variables of a respective test case and corresponding values of output variables of the device under test associated with the respective test case; and
    analyze the sets of test data and determine dependencies within a subset of M variables of the sets of test data to characterize the device under test, wherein analyzing the sets of test data to project a plurality of sets of test data, wherein the plurality of sets of test data comprise an N-dimensional space of variables, onto an M-dimensional space of variables, wherein M<N, in order to determine the dependencies, and wherein the dependencies between the output variables comprise information associated with particular scenarios occurring during testing of the device under test,
    wherein analyze the sets of test data and determine dependencies within a subset of M variables of the sets of test data to characterize the device under test to use Least Absolute Shrinkage and Selection Operator (LASSO) regression to analyze the sets of test data.

2. The test apparatus according to claim 1, wherein M<6 or N≥5M.

3. The test apparatus according to claim 1, wherein the set of input variables comprises at least one of the following: information describing a stimulating signal, information describing a condition under which a test is performed, an information about a firmware setting of the device under test.

4. The test apparatus according to claim 1, wherein generate the plurality of test cases by using one of: a random permutation of a nested loop; and a random sampling of a space of values of the set of input variables.

5. The test apparatus according to claim 1, wherein perform the plurality of test cases using scheduling of multiple test tasks, wherein a test task comprises multiple test cases.

6. The test apparatus according to claim 1, wherein randomly generate values for the one or more input variables within an operating range of the device under test for the one or more input variables.

7. The test apparatus according to claim 1, wherein randomly generate the plurality of test cases using the one or more input variables of the set of input variables, and restrict the one or more input variables to a subset of the set of input variables, wherein the one or more input variables satisfy one or more constraints.

8. The test apparatus according to claim 1, wherein store a current set of test data directly after the current set of test data is created, and wherein store each set of test data using persistent storage.

9. The test apparatus according to claim 1, wherein determine an error prone operating mode of the device under test, and wherein analyze test cases wherein an error occurred to identify dependencies within values of the one or more input variables used to generate the test cases wherein an error occurred.

10. The test apparatus according to claim 1, wherein perform the plurality of test cases randomly on the device under test, wherein a space of values of variables of all sets of test data is randomly filled increasingly by values of variables of current and previous sets of test data.

11. A method of characterizing a device under test, the method comprising:
    generating a plurality of test cases, wherein a test case comprises values of one or more input variables of a set of input variables;
    performing the plurality of test cases on the device under test;
    storing sets of test data, wherein the sets of test data are associated with the plurality of test cases and wherein the sets of test data comprise values of input variables of a respective test case and corresponding values of output variables of the device under test associated with the respective test case; and
    characterizing the device under test by analyzing the sets of test data and determining dependencies between a subset of M variables within the sets of test data,
    wherein the analyzing comprises projecting a plurality of sets of test data onto a M-dimensional space of variables, wherein M<N, in order to determine the dependences, wherein the plurality of sets of test data comprise a N-dimensional space at variables, and wherein the dependencies comprise dependencies between the output variables, and wherein the dependencies comprise information associated with particular scenarios occurring during testing of the device under test, wherein characterizing the device under test by analyzing the sets of test data to use Least Absolute Shrinkage and Selection Operator (LASSO) regression to analyze the sets of test data.

12. The method of claim 11, wherein the set of input variables comprises at least one of: an information describing a stimulating signal; an information describing a condition under which the test is performed; and an information about a firmware setting of the device under test.

13. The method of claim 11, wherein the generating comprises generating the plurality of test cases by using one of: random permutation of a nested loop; and a random sampling of a space of values of the set of input variables.

14. The method of claim 11, wherein the storing comprises storing a current set of test data after the current set of test data is created.

15. The method of claim 11, wherein the storing is configured to persistently store each set of test data.

16. The method of claim 11, wherein the generating comprises randomly generating values for the one or more input variables within an operating range of the device under test for the one or more input variables.

17. A non-transitory digital storage medium having a computer program stored thereon that when executed by a microprocessor performs a method of characterizing a device under test, said method comprising:

generating a plurality of test cases, wherein a test case comprises values of one or more input variables of a set of input variables;

performing the plurality of test cases on the device under test;

storing sets of test data, wherein the sets of test data are associated with the plurality of test cases and wherein the sets of test data comprise values of input variables of a respective test case and corresponding values of output variables of the device under test associated with the respective test case; and characterizing the device under test by analyzing the sets of test data and determining dependencies between a subset of M variables within the sets of test data, wherein the analyzing comprises projecting a plurality of sets of test data onto a M-dimensional space of variables, wherein M<N, in order to determine the dependencies, and wherein the plurality of sets of test data comprise a N-dimensional space of variables, wherein the dependencies comprise dependencies between the output variables, and wherein the dependencies comprise information associated with particular scenarios occurring during testing of the device under test, wherein characterizing the device under test by analyzing the sets of test data to use Least Absolute Shrinkage and Selection Operator (LASSO) regression to analyze the sets of test data.

* * * * *